(No Model.)
J. J. KIRBY.
AUTOMATIC FRICTION FEEDING DEVICE FOR DRILLING AND BORING MACHINES.
No. 290,242. Patented Dec. 18, 1883.
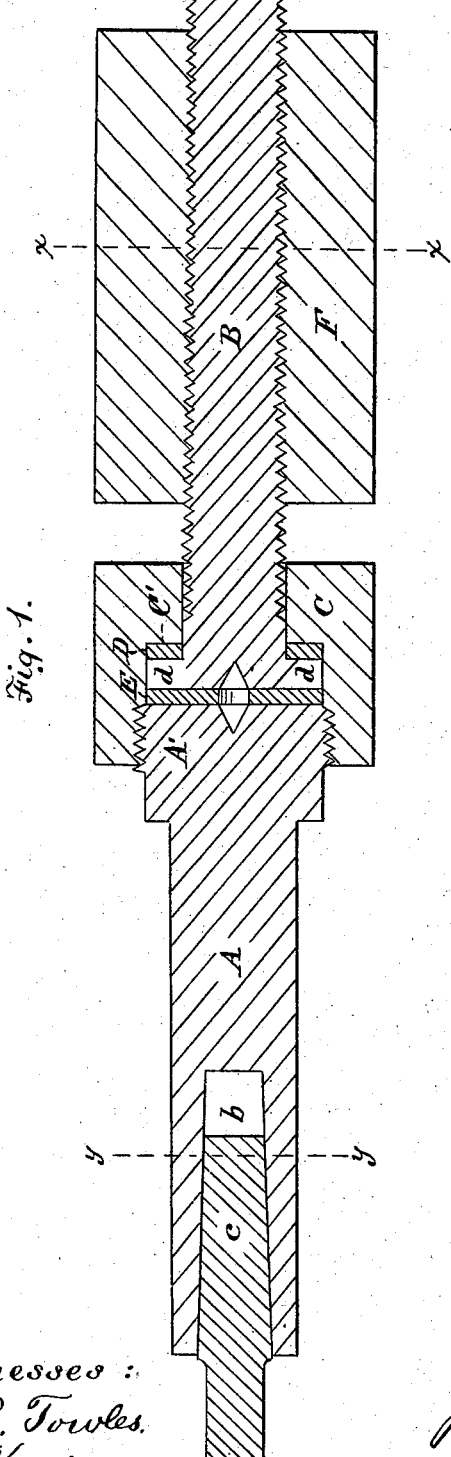
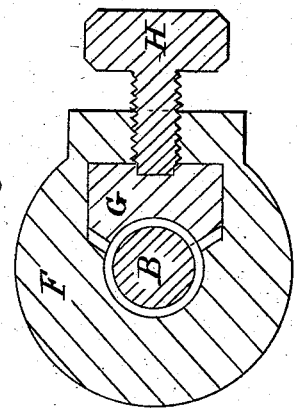
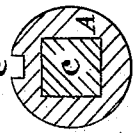
Witnesses:
G. B. Towles.
G. W. Knotts.
Inventor:
James J. Kirby
By W. W. Burris
Attorney

UNITED STATES PATENT OFFICE.

JAMES J. KIRBY, OF CLINTON, IOWA.

AUTOMATIC FRICTION FEEDING DEVICE FOR DRILLING AND BORING MACHINES.

SPECIFICATION forming part of Letters Patent No. 290,242, dated December 18, 1883.

Application filed April 21, 1883. (No model.)

*To all whom it may concern:*

Be it known that I, JAMES J. KIRBY, a citizen of the United States of America, residing at Clinton city, in the county of Clinton and State of Iowa, have invented certain new and useful Improvements in Adjustable Friction-Feed for Drilling, Boring, and Turning Machines, of which the following is a specification, reference being had therein to the accompanying drawings.

My invention relates to improvements in automatic feed devices for drilling, boring, and turning machines; and the object is the construction of such feeding devices in a compact form, readily attachable to any kind of a drill, boring, or turning machine, and particularly adapted for ratchet, track, and power drills.

In the drawings, Figure 1 is a central longitudinal section. Fig. 2 is a cross-section on line $x$ $x$ of Fig. 1. Fig. 3 is a cross-section on line $y$ $y$ of Fig. 1.

A represents the drill-shaft, provided with a socket, $b$, to receive and hold the drill $c$, and having a groove, $c'$, to receive the feather on a driving-pulley. (Not shown.) This shaft is constructed with an enlarged head, A', which screws into the coupling-collar C.

B represents a feed-screw provided with a flanged head, $d$, which fits in a recess in the collar C.

D and E represent packing or washers, of leather, rubber, or other suitable material, inserted between the heads A' $d$ and shoulder C' of the collar, as shown in the drawings. The feed-screw runs in a threaded socket in the block F. The surfaces which have their bearings against the packing or washers D E are made smooth, to cause as little friction and wear as possible.

The operation of the devices is as follows: The collar C, being screwed up tightly against the washer D, bears the flanged head $d$ of the feed-screw against the washer E, which bears against the end of the head A' of the drill-shaft, which shaft, being set in motion, turns by friction upon the head $d$, the screw B, forcing out the drill and causing it to engage the substance being bored or drilled. The pressure and resistance thus produced upon the drill create additional friction upon the bearings of the screw-threads on the feed-screw in the block F, partially overcoming the rotary force produced, as described, upon the head $d$, which slips in its bearings, and thus the movement of the feed-screw is retarded, feeding the drill as fast only as it cuts away the substance being operated upon. In practice it is found that the speed of the feed-screw is in proportion to the hardness or softness of the substances being bored or drilled. For example, plates of lead, iron, and steel being placed in the order named upon a pine board and the drill applied, the feed-screw forced the drill rapidly through the wood, slightly less rapidly through the lead, still less rapidly through the iron, and the feed-screw stopped moving when the drill came in contact with the steel.

It is evident that the retarding force upon the feed-screw will be less with the use of a small drill than with a large drill, and that in changing from the use of the latter to the former some suitable devices are required to regulate the speed of the feed. Any suitable means by which the movement of the screw B will be retarded may be employed for the purpose. Fig. 2 illustrates one method of accomplishing this by means of a thumb-screw, H, adjusted to impinge upon a friction-block, G, arranged in a seat in the block F, to bear upon the screw B.

What I claim as new, and desire to secure by Letters Patent, is—

1. The combination, with the drill-shaft A, having the enlarged head A', of the feed-screw B, arranged in the block F, and provided with the flanged head $d$, the collar C, having the bearing-shoulder C', and the washers D E, substantially as and for the purposes described.

2. The combination, with the drill-shaft A, having the enlarged head A', of the feed-screw B, arranged in the block F, and provided with the flanged head $d$, the collar C, having the bearing-shoulder C', the washers D E, and the set-screw H, and friction-block G, substantially as and for the purposes described.

In testimony whereof I here affix my signature in presence of two witnesses.

JAMES J. KIRBY.

Witnesses:
WILLIAM LAKE,
WILLIAM W. SANBORN.